(12) United States Patent
Schunke et al.

(10) Patent No.: US 7,191,678 B2
(45) Date of Patent: Mar. 20, 2007

(54) ELECTROMOTIVE ADJUSTMENT DEVICE

(75) Inventors: Kurt Schunke, Minden (DE); Bernd Buchholz, Rahden (DE); Dieter Palm, Werther (DE); Gerhard Bruns, Bückeburg (DE)

(73) Assignee: RK Rose + Krieger GmbH & Co. KG Verbindungs-und Positioniersysteme, Minden (DE)

( * ) Notice: Subject to any disclaimer, the term of this patent is extended or adjusted under 35 U.S.C. 154(b) by 0 days.

(21) Appl. No.: 10/693,829

(22) Filed: Oct. 24, 2003

(65) Prior Publication Data
US 2005/0109142 A1 May 26, 2005

Related U.S. Application Data

(63) Continuation of application No. PCT/EP02/03837, filed on Apr. 6, 2002.

(30) Foreign Application Priority Data
Apr. 27, 2001 (DE) .......................... 201 07 326 U

(51) Int. Cl.
*H02K 7/116* (2006.01)
(52) U.S. Cl. .................. 74/421 A; 74/413; 74/414
(58) Field of Classification Search ............. 74/413, 74/414, 421 A, 412 R; 310/83, 75 R, 67 R, 310/49 R, 162
See application file for complete search history.

(56) References Cited

U.S. PATENT DOCUMENTS

| | | | | |
|---|---|---|---|---|
| 2,436,746 A * | 2/1948 | Drought | ...................... | 74/325 |
| 3,227,420 A * | 1/1966 | Scott | .......................... | 254/284 |
| 3,247,736 A * | 4/1966 | Karlheinz | ..................... | 74/462 |
| 3,973,449 A | 8/1976 | Berlinger, Jr. | | |
| 3,998,008 A * | 12/1976 | Collins | .......................... | 49/47 |
| 4,147,071 A * | 4/1979 | Scribner et al. | .............. | 74/409 |
| 4,249,281 A * | 2/1981 | Meyer et al. | .............. | 15/340.2 |
| 4,631,456 A * | 12/1986 | Drescher et al. | ............ | 318/140 |
| 4,655,099 A * | 4/1987 | Hansen | ..................... | 74/421 A |
| 4,669,578 A | 6/1987 | Fukamachi | | |
| 4,844,120 A * | 7/1989 | Myers | ........................ | 454/335 |
| 5,704,460 A * | 1/1998 | Leimbach | ................ | 192/70.25 |
| 5,779,540 A * | 7/1998 | Nailor | ........................ | 454/369 |
| 6,186,471 B1 | 2/2001 | Genga et al. | | |
| 6,577,034 B1 * | 6/2003 | Kitamura et al. | ............. | 310/83 |

FOREIGN PATENT DOCUMENTS

| | | |
|---|---|---|
| CH | 614 507 A | 11/1979 |
| DE | 41 29 928 A1 | 3/1993 |
| DE | 44 03 574 C1 | 1/1995 |
| DE | 199 81 897 T1 | 3/2001 |

* cited by examiner

Primary Examiner—Richard Ridley
Assistant Examiner—Justin Krause
(74) Attorney, Agent, or Firm—Henry M. Feiereisen

(57) ABSTRACT

An electromotive adjustment device for adjusting a control element includes a housing and a gear mechanism which has a plurality of intermeshing gear wheels to define a drive train. In driving relationship with the gear mechanism is a drive motor which is constructed as a brushless motor with an external rotor and includes an output journal, whereby the output journal has a tooth portion in engagement with a helical spur gear wheel of the gear mechanism.

12 Claims, 4 Drawing Sheets

ELECTROMOTIVE ADJUSTMENT DEVICE

CROSS-REFERENCES TO RELATED APPLICATIONS

This application is a continuation of prior filed copending PCT International application no. PCT/EP02/03837, filed Apr. 6, 2002, on which priority is claimed under 35 U.S.C. §120, the disclosure of which is hereby incorporated by reference.

This application claims the priority of German Patent Application, Serial No. DE 201 07 326.9, filed Apr. 27, 2001, pursuant to 35 U.S.C. 119(a)-(d), the disclosure of which is incorporated herein by reference.

BACKGROUND OF THE INVENTION

The present invention relates to an electromotive adjustment device, in particular for use with adjustable flap valves.

An electromotive adjustment device of a type involved here finds application especially in heating, air-conditioning and ventilation systems for opening and closing a control element of a flap valve. The respective adjusting movement depends hereby on the intended purpose. For example, in case of fire, it may be necessary to open or close the flap valves, whereby it is demanded that the pivoting movement of the control element should not be assumed by the drive motor but by an energy storage member, such as a tensed spring, so as to ensure execution of the necessary movement, even when the drive motor fails to operate as a consequence of external impacts, e.g. elevated temperature. The energy storage member is hereby biased, when the control element is moved from a base position to the operative position that is normally assumed by the control element. There may, however, also be situations which require movement of the control element into different positions at short intervals in response to a change in temperature.

Swiss Pat. No. CH-A-614507 and U.S. Pat. No. 4,669,578 describe each an electromotive adjustment device with drive motors in the form of brush motors having a fixed external stator and a rotating armature to thereby drive the output journal. Mounted non-rotatably onto the output journal are spur gears to operate the drive train. Drive motors of this type generate sparks during startup, thereby progressively wearing off the drive motor. As the adjustment devices involved here are primarily intended for heating and ventilation systems, a precise control requires the motor to be started momentarily at relatively short intervals.

The partial circle or outer diameter of the gear wheels mounted onto the output journals is significantly greater than the diameter of the output journal. As a result, the number of teeth is correspondingly high so that the first gear stage to reduce the motor speed requires either the application of a gear wheel with correspondingly great number of teeth for engagement with the gear wheel on the output journal, or the rotation speed of this gear wheel has to be relatively high. In either approach, the housing of the adjustment device is of substantial size. Normally, in adjustment devices of the type involved here, the rotation speed of the output members of the drive train is extremely low. As the installation space is relatively small, the use of conventional adjustment devices caused problems that even render their installation prohibitive. In addition, conventional adjustment devices have to be suited to the rotation direction of the control element. In other words, counterclockwise rotation and clockwise rotation require an electric switchover.

It would therefore be desirable and advantageous to provide an improved electromotive adjustment device which obviates prior art shortcomings and which has small dimensions and does not require a switchover for moving the control element in both rotation directions, while yet being reliable in operation, even when the drive motor malfunctions.

SUMMARY OF THE INVENTION

According to one aspect of the present invention, an electromotive adjustment device includes a housing, a gear mechanism including a plurality of intermeshing gear wheels to define a drive train, and a drive motor constructed a brushless motor with an external rotor and including an output journal in driving relationship with the gear mechanism, wherein the output journal has a tooth portion in engagement with a helical spur gear of the gear mechanism.

The use of a brushless drive motor allows the provision of a driving element which is substantially wear-resistant so that the service life is effectively unlimited. By meshing a helical spur gear with the output journal of the drive motor, the tooth system of the output journal of the drive motor is determined. The partial circle diameter of the tooth system of the output journal is significantly reduced, compared to conventional constructions, so that a greater ratio of the number of teeth is realized, when the output journal and the meshing gear are of same dimension. Thus, the motor speed is correspondingly reduced so that the downstream gears of the gear mechanism can be dimensioned of smaller diameter. The drive motor can also be labeled as bell-shaped motor, i.e. the rotor is external and rotates about the internal stationary stator. Of course, the motor may also be constructed as synchronous motor or stepper motor. Suitably, the revolving field is generated electronically.

According to another feature of the present invention, the output journal may have an evoloid gear tooth system with multiple teeth, preferably three teeth. Through the provision of an evoloid tooth system, the number of teeth of the geared output journal can be kept as small as possible. As a result, the motor speed can be reduced significantly already in the first gear stage or the dimensions can be made smaller. Although the provision of a geared output journal is currently preferred, it is also possible to reduce the partial circle diameter by mounting a gear wheel with an evoloid gear tooth system on the output journal. The further gear wheels of the gear mechanism can have oblique teeth, although gear wheel with straight teeth may, of course, also be used.

According to another feature of the present invention, the gear mechanism has an output member which can be coupled to a shaft, suitably a hollow shaft, whereby the shaft extends through two openings of the housing in opposite relationship in such a manner that the ends of the shaft can be selectively connected to a control element in dependence on a rotation direction of the attached control element. Unlike in conventional constructions, through respective installation, the control element rotates either clockwise or counterclockwise, when the motor is supplied with power. In other words, depending on the desired rotation direction, either end of the shaft can be coupled with the control element. Suitably, the shaft is provided with internal teeth or an internal profile for connection to the output member of the drive train, so as to establish a form-fitting connection with the control element or a connecting element.

According to another feature of the present invention, the drive train has at least two gear stages for reducing the motor speed. Suitably, double gear wheels are provided to keep the number of components as small as possible.

According to another feature of the present invention, the gear wheels that define the gear stages may be supported by a common carrier to which the drive motor may also be flange-mounted. In this way, a unitary structure is established which can be pre-fabricated so that all components are easy to access. In addition, the provision of a prefabricated structure is also easy to maintain and to repair. The housing may be constructed with comparably thin walls because the forces to be absorbed remain relatively small. Moreover, an operative drive unit is realized that may make the provision of a housing, in some cases, unnecessary.

According to another feature of the present invention, a spring element may be provided for shifting the control element in a direction.

According to another feature of the present invention, the housing may be comprised of two housing portions. Suitably, the partition plane is in midsection of the housing.

According to another feature of the present invention, the drive motor has an attachment flange which may be constructed in single-piece configuration with the carrier. This eliminates the need for additional fasteners so that the number of components is further decreased. As a result, the adjustment device becomes small and compact.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
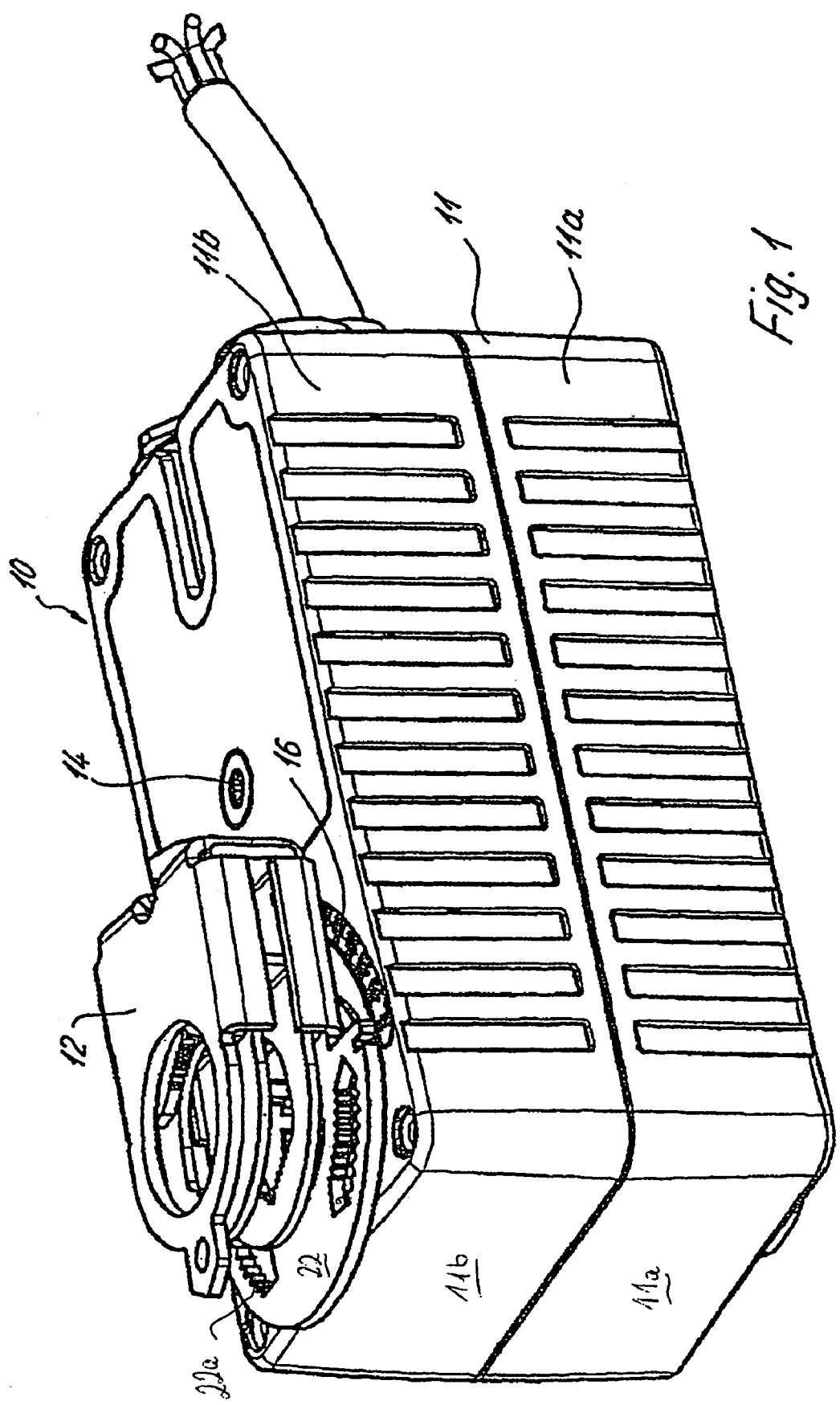
FIG. 1 is a perspective illustration of an electromotive adjustment device according to the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

This is one of four applications all filed on the same day. These applications deal with related inventions. They are commonly owned and have same inventive entity. These applications are unique, but incorporate the other by reference. Accordingly, the following U.S. patent applications are hereby expressly incorporated by reference: "Adjustment Device", "Adjustment Drive" and "Electromotive Servo Drive", respectively.

Turning now to the drawing, and in particular to FIG. 1, there is shown a perspective illustration of an electromotive adjustment device according to the present invention, generally designated by reference numeral 10. The adjustment device 10 includes a housing 11 which has a block-shaped configuration with profiled side walls. The housing 11 is comprised of two housing portions 11a, 11b. Although not shown in detail, the housing portions 11a, 11b are screwed together at their corners by suitable screw fasteners. The partition plane of both housing portions 11a, 11b extends approximately in midsection of the housing 11, as relating to the vertical extension. Each of the housing portions 11a, 11b is provided in an end zone with an attachment member 12, 13, with the attachment members 12, 13 being of identical configuration, to allow securement of the adjustment device 10 to a suitable assembly, e.g. a flap valve, having a control element to be adjusted. For sake of simplicity, the control element as well as the driving relationship between the control element and the output member of the adjustment device are not shown in detail in the drawing.

The adjustment device 10 includes an actuating shaft 14 which can be manually operated by a suitable tool to move the control element into a base position and to set a spring element 15 (FIG. 2), e.g. a spiral spring, under tension. Each housing portion 11a, 11b is hereby provided with a scale 16 to indicate, for example, the base position of the control element, e.g. a flap valve, as a function of the rotation angle.

Figure 2:
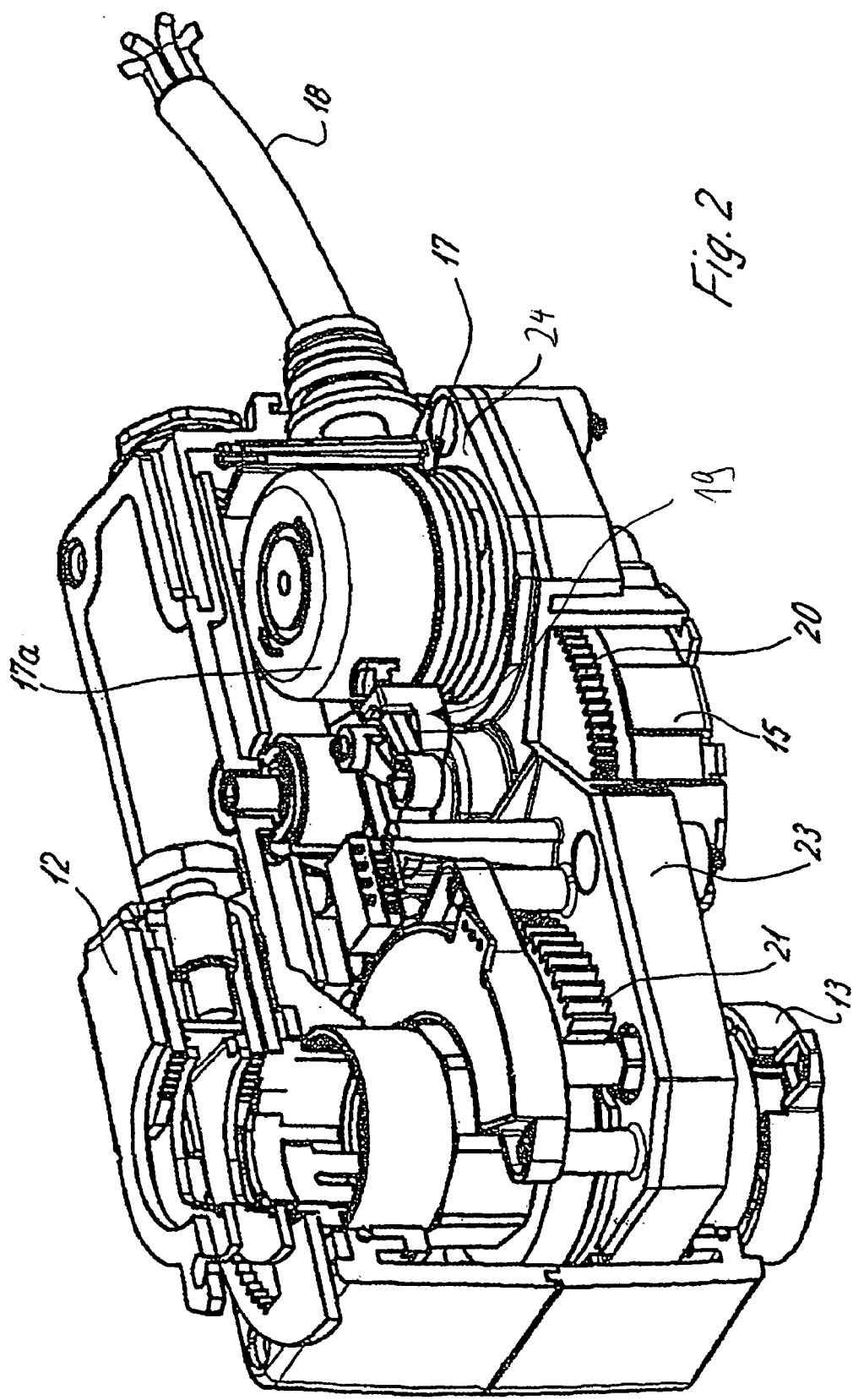
FIG. 2 is a perspective illustration of the adjustment device of FIG. 1, with the housing being partly broken away to show internal components of the adjustment device.
Figure 5:
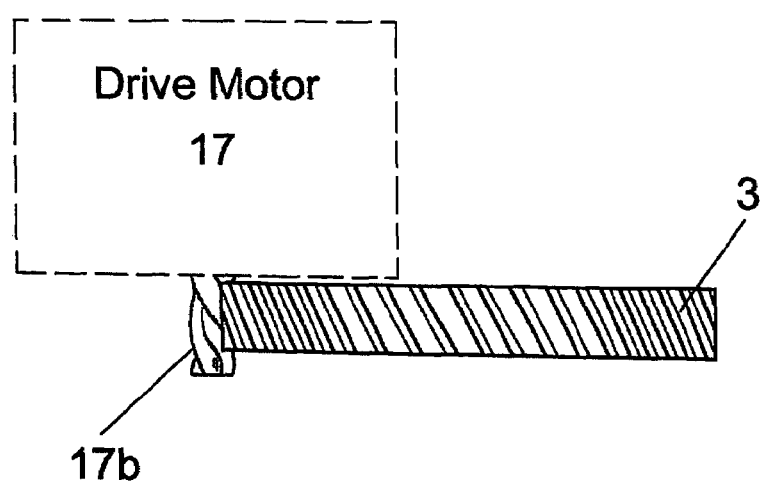
FIG. 5 is a side view of an output shaft of a drive motor of the adjustment device in mesh with a gear wheel.

As shown in FIG. 2, the adjustment device 10 includes a brushless drive motor 17 having an external rotor 17a and receiving energy via a multicore cable 18. Operatively connected to the rotor 17a is a locking device, generally designated by reference numeral 19 and provided to keep the rotor 17a immobile, as the spring element 15 is tensioned. The locking device 19 does not form part of the instant application and thus is not described in more detail for the sake of simplicity. The drive motor 17 has an output journal 17b, shown in FIG. 5, which may be a geared output shaft with an evoloid gear tooth system with multiple teeth, suitably three teeth, or has an output shaft with an evoloid gear tooth system with multiple teeth, suitably three teeth, whereby the output journal 17b, as shown in particular in FIG. 5, is in mesh with a helical gearwheel 3.

Figure 3:
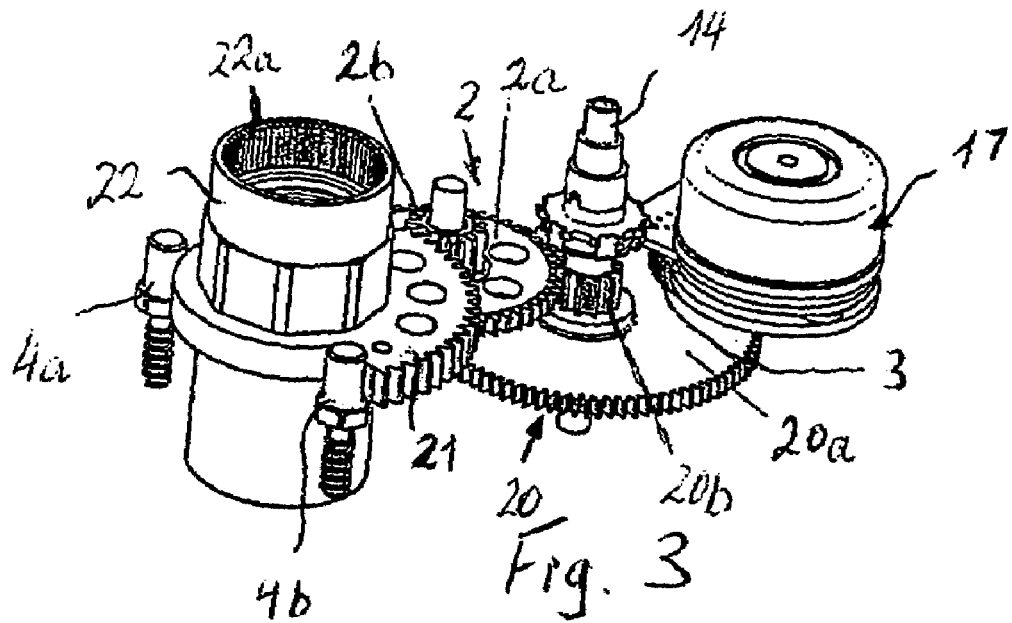
FIG. 3 is a perspective view of the drive train of the adjustment device of FIG. 1.
Figure 4:
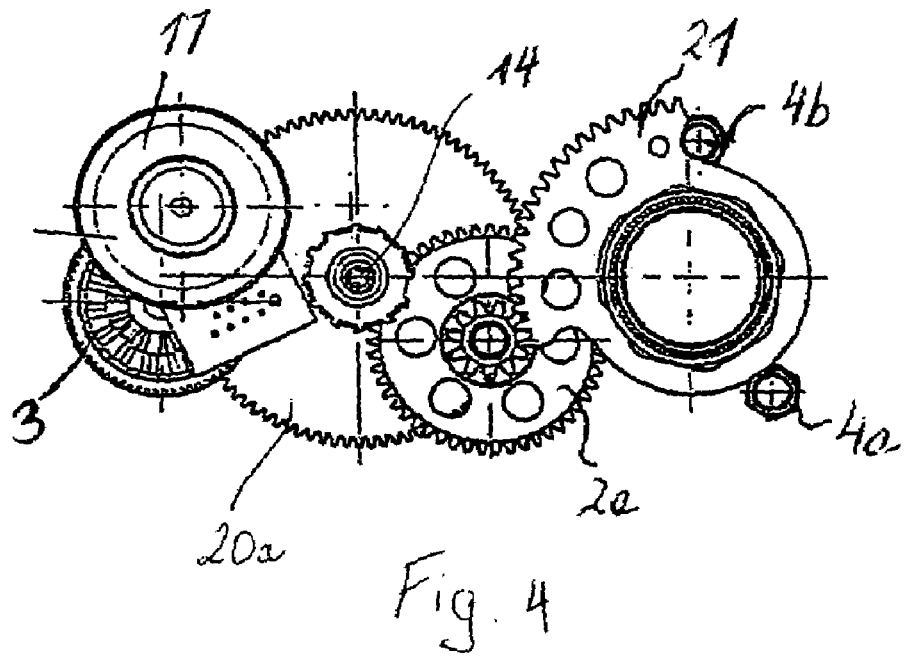
FIG. 4 is a top plan view of the electromotive adjustment device of FIG. 1.

The helical gear wheel is part of a double gear wheel assembly whose other smaller gear wheel (not shown) is in fixed rotative engagement with a gear wheel 20a of a double gear wheel assembly, generally designated by reference numeral 20. The gear wheel 20a has a relatively high number of teeth and is operatively connected to the spring element 15 and supported on the actuating shaft 14. The other gear wheel 20b of the double gear wheel assembly 20 (FIG. 3) has a significantly smaller number of teeth and drives a greater gear wheel 2a of a further double gear wheel assembly, generally designated by reference numeral 2 (FIGS. 3 and 4) whose other smaller gear wheel 2b is in mesh with a gear wheel 21 which has a relatively high number of teeth. The gear wheel 21 represents the output member of the drive train and has a tooth segment extending about 90°. The gear wheel 21 has a central bore for receiving a hollow shaft 22 which extends through openings in the housing portions 11a, 11b (FIG. 2). To restrain a rotation of the hollow shaft 22 in the bore of the gear wheel 21, both the hollow shaft 22 and the bore of the gear wheel 21 have complementary profiles. The hollow shaft 22 is provided with internal teeth 22a to attain a form-fitting connection with a coupling element (not shown) that is inserted through access openings of the attachment members 12, 13 for adjusting the control element. The double gear wheel assembly 20, comprised of gear wheel 20a and gear wheel 20b, together with the double gear wheel assembly 2 and the gear wheel 21 form the drive train and define two gear stages.

As further shown in particular in FIG. 2, the double gear wheel assemblies 2 and 20 as well as the gear wheel 21 are supported by a carrier 23 which extends across the housing portion 11a. In addition, the drive motor 17 has an attachment flange 24 for optional securement of the drive motor 17 to the carrier 23.

In the base position of the control element, the spring element 15 is tensed by the activated drive motor 17 via the drive train to store energy. As soon as the gear wheel 21 strikes against one of two stops 4a, 4b (FIGS. 3 and 4), the drive motor 17 is de-energized to enable the spring 15 to reverse the drive motor 17, as the spring 15 relaxes. The spring 15 is formed hereby on one end with a catch for operative connection to the gear wheel 20a so that the spring 15 is moved by the gear wheel 20a. In case of overheating of the adjustment device as a result of fire and failure of the drive motor 17 or as a result of a cut of the power supply, the control element is returned to the base position by the restoring force of the spring element 15, as the spring element 15 is released.

Suitably, the components of the adjustment device 10, including the housing 11, are made of metal, e.g. steel or non-ferrous heavy metal, so that the drive train is operational, even in case of fire, i.e. when exposed to elevated temperatures.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An electromotive adjustment device for adjusting a control element, comprising:
    a housing;
    a gear mechanism including a plurality of intermeshing gear wheels to define a drive train; and
    a drive motor constructed as a brushless motor with an external rotor and including an output journal in driving relationship with the gear mechanism, wherein the output journal has a tooth portion in engagement with a helical spur gear wheel of the gear mechanism wherein the output journal has an evoloid gear tooth system with three teeth.

2. The electromotive adjustment device of claim 1, wherein the gear mechanism has an output member, and further comprising a shaft having opposite ends and linked to the output member, said shaft extending through two openings of the housing in opposite relationship so that the ends of the shaft are selectively connectable with the control element in dependence of a rotation direction of the control element.

3. The electromotive adjustment device of claim 2, wherein the shaft is a hollow shaft.

4. The electromotive adjustment device of claim 1, wherein the gear mechanism has at least two gear stages for reducing a motor speed of the drive motor.

5. The electromotive adjustment device of claim 4, wherein the gear mechanism has two gear wheels to define the gear stages, and further comprising a carrier for supporting the gear wheels.

6. The electromotive adjustment device of claim 5, wherein the drive motor is mounted to the carrier.

7. The electromotive adjustment device of claim 6, wherein the drive motor has an attachment flange in single-piece configuration with the carrier.

8. The electromotive adjustment device of claim 1, and further comprising a spring element for moving the control element in one direction.

9. The electromotive adjustment device of claim 8, and further comprising a manually operated shaft for setting the spring element under tension.

10. The electromotive adjustment device of claim 1, wherein the housing has two housing portions threadably connected to one another at a partition plane.

11. The electromotive adjustment device of claim 10, wherein the partition plane extends in a mid-plane of the housing.

12. The electromotive adjustment device of claim 1, wherein the drive motor is selected from the group consisting of synchronous motor and stepper motor, with a revolving field generated electronically.

* * * * *